Dec. 27, 1927. 1,654,430
J. L. PICKENS
NUT CRACKING MACHINE
Filed Oct. 15, 1926 3 Sheets-Sheet 2

INVENTOR
J. L. Pickens
BY
ATTORNEYS

Dec. 27, 1927.
J. L. PICKENS
NUT CRACKING MACHINE
Filed Oct. 15, 1926
1,654,430
3 Sheets-Sheet 3
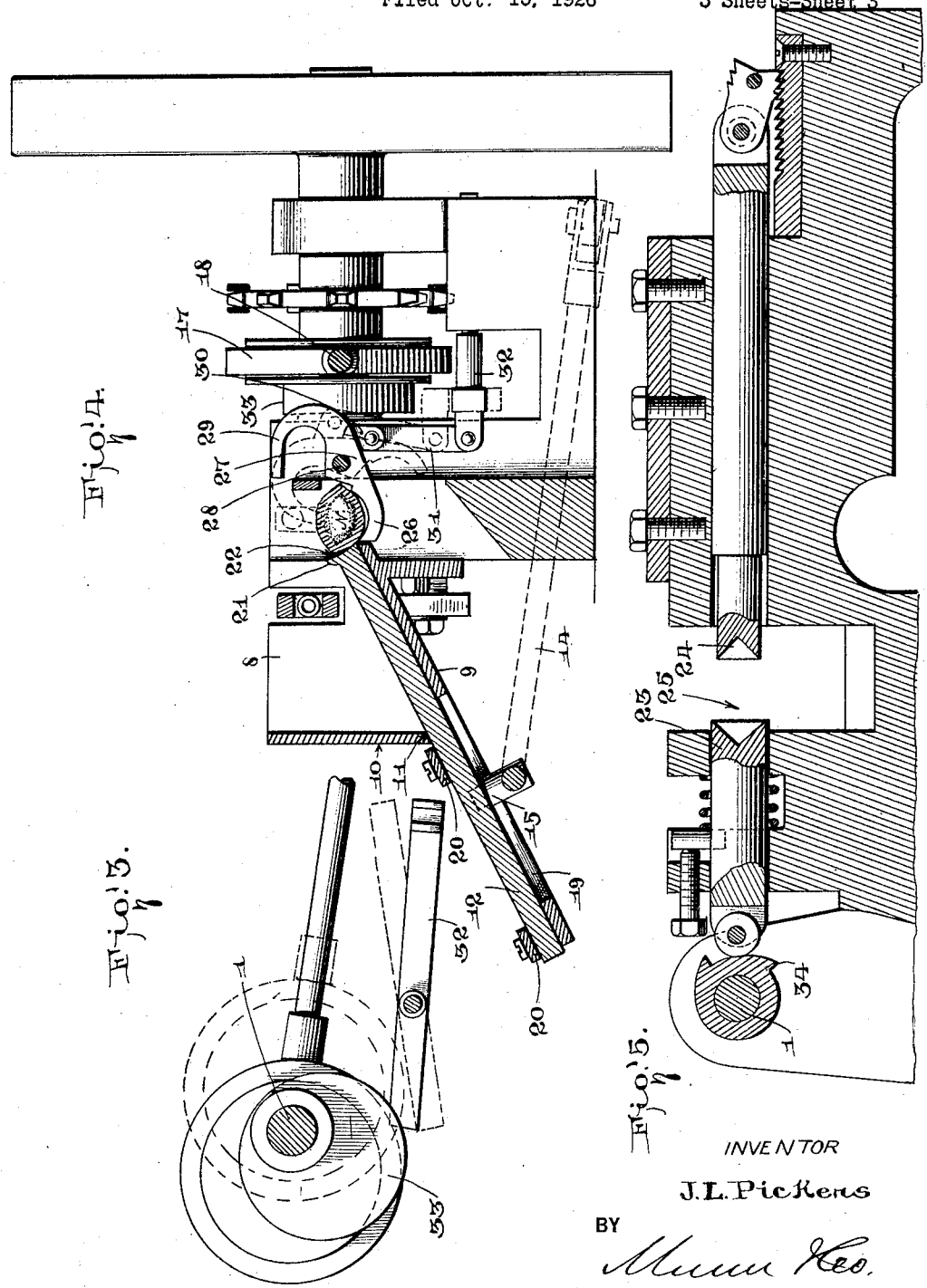
INVENTOR
J. L. Pickens
BY
ATTORNEYS Patented Dec. 27, 1927.

1,654,430

UNITED STATES PATENT OFFICE.

JOHN L. PICKENS, OF ARDMORE, OKLAHOMA.

NUT-CRACKING MACHINE.

Application filed October 15, 1926. Serial No. 141,775.

This invention relates to improvements in nut cracking machines, an object being to provide an arrangement for placing the nut in position between the cracking plungers in the proper longitudinal position so that the thrust of the plungers will be exerted against the ends of the nut.

Another object of the invention is to provide a trap by which the fragments and nut meats or kernels are ejected from the cracking chamber.

Figure 1:
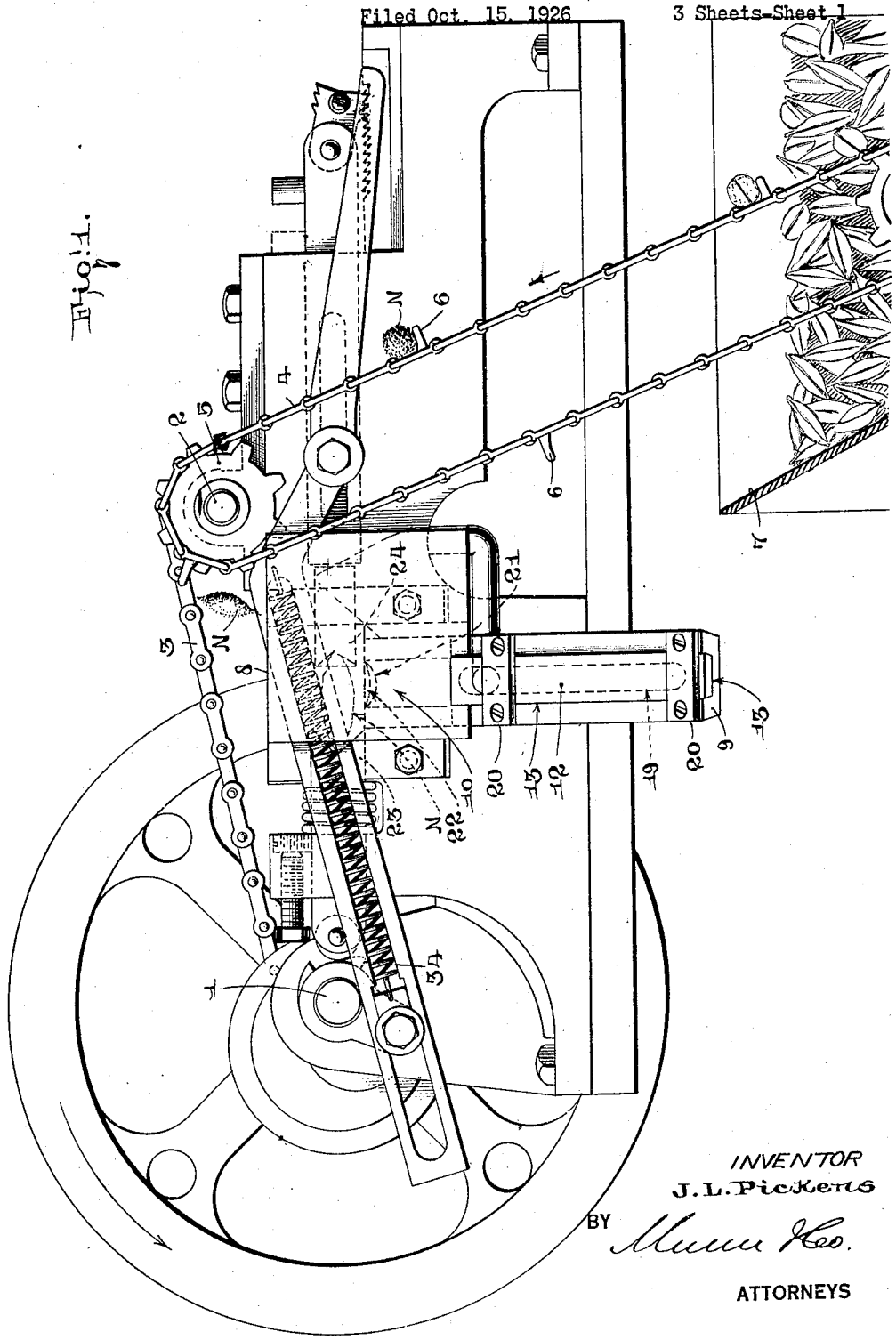
Figure 2:
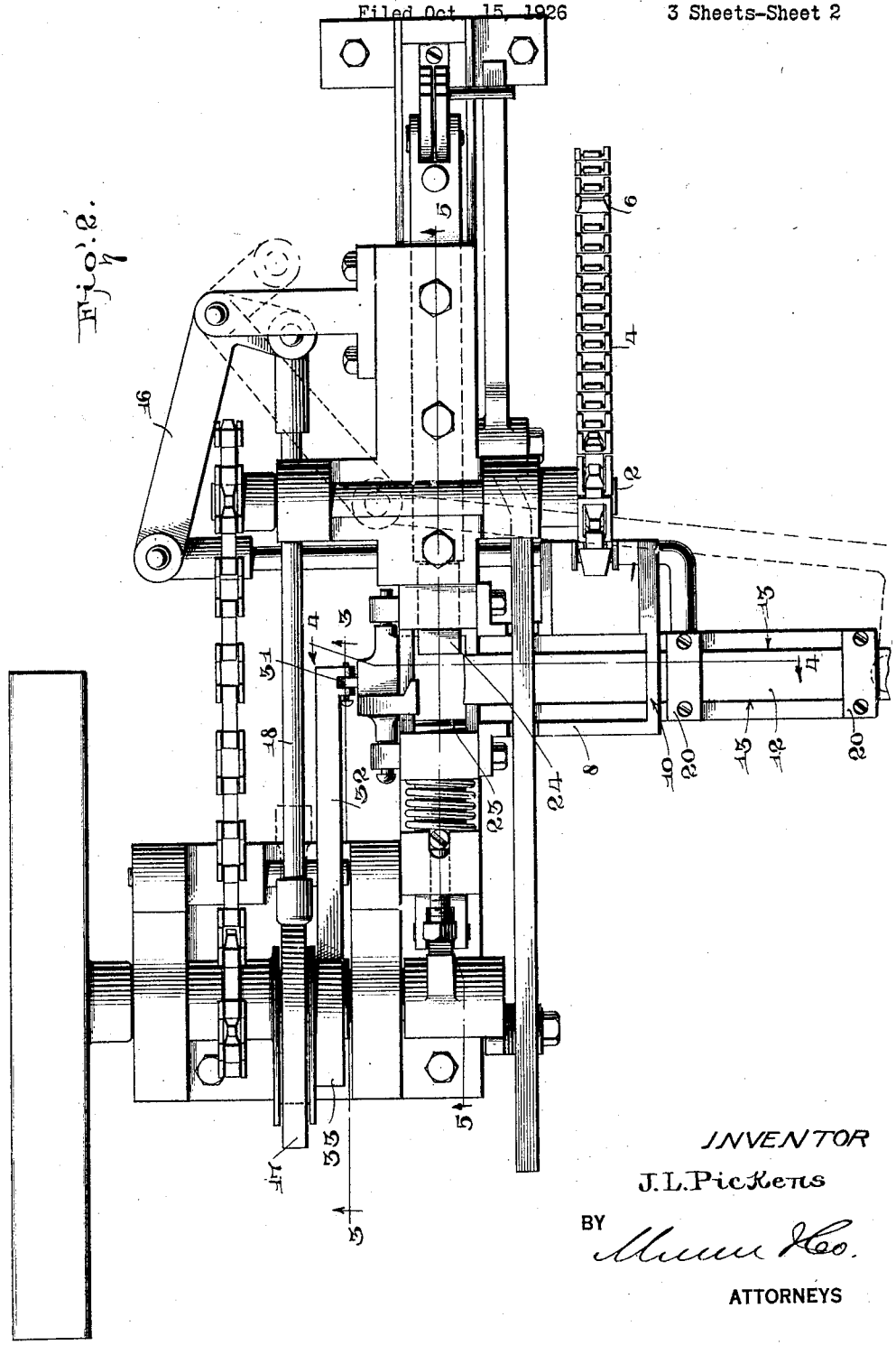

Other objects and advantages will appear in the following specification, reference being had to the accompanying drawings, in which, Figure 1 is a side elevation of a nut cracking machine embodying the improvements, Figure 2 is a plan view thereof, Figure 3 is a detail section on the line 3—3 of Figure 2, Figure 4 is a cross section taken on the line 4—4 of Figure 2, Figure 5 is a longitudinal section taken on the line 5—5 of Figure 2.

The invention is an improvement on the nut cracking machine of H. C. Atwood disclosed in Patent 1,412,443 of September 11, 1922. Only such portions of the patented machine as are immediately concerned with the invention are herein described.

A power shaft 1 drives a counter shaft 2 by means of a chain 3 which is applied to sprockets on both shafts. An elevator chain 4 applied to a sprocket 5 on one end of the countershaft 2, has projections 6 which lift the nut N from a receptacle 7 as the elevator chain passes through in the manner plainly shown in Figure 1.

Each nut N picked up by the projections of the elevator chain is discharged into a receiving chamber 8 (Figures 1, 2 and 4). A portion 9 of the bottom of the receiving chamber is inclined (Figure 4) so that the nut will gravitate to a point adjacent to the front wall 10. This wall is slotted at 11 to admit a placer bar 12. The bottom 9 is grooved at 13 forming a guide in which the bar 12 is reciprocable by a rod 14 connected with a stud 15 on the bar 12 and one arm of a bell-crank 16. An eccentric or cam 17 on the power shaft rocks the bell-crank by means of a rod 18 connected with the other arm thereof. The stud 15 rides in a slot 19. Clips 20 hold the placer bar 12 in position.

Formed upon the upper side of the placer bar 12 is a concave 22 diverging from about the center of the bar to the end for the purpose of bringing each nut to a longitudinal rolling motion as the placer bar moves backward, the nut having been fed into chamber 8 while the bar is upward, insuring that the nut shall assume a longitudinal position between the cracking plungers 23 and 24 when it reaches the space 25 conveniently known as the cracking chamber. The bottom of this chamber is defined by the curved receiver 26 (Figure 4) of a trap 27, and it is upon this receiver that the nut is deposited in position between the cracking plungers in the manner stated.

In order that the foregoing action of the placer bar 12 and the concave 22 may take place as described, it is necessary that a nut N be deposited into the receiving chamber 8 while the bar 12 is near the top of its stroke, the placer bar having a slight hollowing on the upper surface as stated above and said impression being diverged toward placer bar end 22 in order when a nut is deposited on bar inside of chamber 8 the backward or downward motion of bar arights the nut in a longitudinal position. As the bar moves backward, being drawn from under the nut, the nut falls over end of bar and is pushed upward to cracking chamber, and the timing and arrangement of the machine parts is such that the proper mode of operation will be carried out. The trap 27 is hingedly mounted at 28. It has a second but more pronounced curvature 29. This curvature is more in the nature of a hook and is herein known as the ejector inasmuch as the function thereof is to move into the crushing chamber (see dotted line, Figure 4) to force out any fragments that may remain after the crushing operation. The trap has an ear 30 to which the link 31 of a rocker 32 is pivoted. The rocker is operated by a cam 33 (Figure 3) on the power shaft 1.

The operation is readily understood. Continuous operation of the elevator chain 4 (Figure 1) periodically deposits a nut N into the receiving chamber 8 wherein it gravitates to a point adjacent to the front wall 10 on top of the placer bar 12. In Figure 4 the placer bar is shown at the uppermost end of one stroke, and the timing of the mechanism is such that a nut will be deposited when the placer bar is near this position, as stated above.

The improvement herein disclosed is designed for placing nuts, especially of elongated shape, in position between the cracking plungers 23 and 24 (Figure 5). Moreover, it is the purpose of the improvement to place such nuts in longitudinal positions so that the pressure of the plungers will be exerted against the ends of the nut.

Upon the upward stroke of the placer bar 12 the action of the concavity 22 against the nut will be such as to continuously roll the nut up and over the inclined bottom 9 so that it will be forced to assume the aforesaid position when deposited upon the curved receiver 26 of the trap 27. The action of the plungers 23 and 24 now is to exert pressure against the ends of the nuts and thereby to crush the shell. The next act is that of the rocking of the trap 27 so that it assumes the dotted line position in Figure 4. This permits the shell fragments and kernels to drop out into any suitable receiver. The rocking of the trap 27 is accomplished by the cam 33 and the rocker 32 which actuates it, the rocker having a link connection 31 with the ear 30 of the trap.

Should the shell fragments stick in the cracking chamber 25 between the plungers, the ejector 28 coming into position in the cracking chamber will force out such fragments, clearing the cracking chamber for the next operation.

As an aid to ejector 28 for cleaning the cracking plunger end of fragments of nuts after the cracking operation, cam 34 is used immediately succeeding the cracking cam and is attached to the same bearing with the cracking cam which is operated on power shaft 1. This gives a double cracking operation one succeeding the other with a short interval; the first to crack the nut and the second to shake or jar the cracking plunger so as to remove all fragments of nuts from the cracking plunger pit for the next operation. The machine is timed so as soon as ejector 28 has made its operation and removed all fragments that stick to and project beyond the face or surface end of the cracking plunger, the second or ejector cam 34 (Figures 1 and 5) duplicates the operation of the cracking cam and is intended to jar out all particles left by ejector 28 leaving cracking plunger pit clean for the next operation.

While the construction and arrangement of the improved nut cracking machine is that of a generally preferred form, obviously modifications and changes may be made without departing from the spirit of the invention or the scope of the claims.

I claim:—

1. A nut cracking machine having cracking plungers, means for moving elongated nuts toward said plunger and means to impart to said nuts a rolling motion causing them to assume a longitudinal cracking position.

2. A nut cracking machine having cracking plungers, a reciprocable element for pushing nuts into cracking position between the plungers, means upon the element imparting a rolling motion to the nuts causing them to assume a position with the long axis substantially in line with the plungers.

3. A nut cracking machine having cracking plungers, a reciprocable element for pushing elongated nuts toward the plungers, and a concavity formed on the pushing end of the element causing a rolling motion of the nuts so that they assume an elongated cracking position between the plungers.

4. A nut cracking machine having cracking plungers, a receiver into which elongated nuts are deposited, an element reciprocable over the bottom of the receiver for pushing the nuts towards the plunger, and a concavity on the pushing end of the element adjoining said bottom of the receiver giving the nut a rolling motion during movement towards the plungers causing them to assume a longitudinal cracking position between the plungers.

5. A nut cracking machine having cracking plungers, a receiver into which elongated nuts are deposited, an inclined bottom sloping upwardly toward the cracking chamber between the plungers, an element reciprocable over the inclined bottom for pushing the nuts toward said chamber, the pushing end of said element having a concavity adjoining the inclined bottom imparting a rolling motion to the nuts causing them to assume a longitudinal cracking position.

6. A nut cracking machine having cracking plungers, a receiver at one side of the plungers into which elongated nuts are deposited, a bottom for the receiver sloping away from the plungers in the downward direction, causing the nuts to gravitate to the lowest point in the receiver, an element reciprocable over the sloping bottom for pushing the nuts to the cracking chamber between the plungers, said element having a concave end movable from said lowest point to a place adjacent the cracking chamber imparting a rolling motion to the nuts as they pass over the sloping bottom causing them to assume a longitudinal cracking position.

7. A nut cracking machine having plungers, a receiver at one side of the plungers into which elongated nuts are deposited, a bottom for the receiver sloping away from the plungers in the downward direction, causing the nuts to gravitate to the lowest point in the receiver, an element operable in said receiver having a concave upper surface diverging from a point near the center of the element to the pushing end, and means reciprocating said element so that nuts when deposited in the receiver and said element moves backward or downward from under the nut the nuts are caused to fall in front of the concave pushing end which elevates the nut in an elongated position to the cracking plungers.

8. A nut cracking machine having cracking plungers and a power shaft for operating them, a receiver into which elongated nuts are deposited having a bottom sloping away from the plungers in a downward direction causing the nuts to gravitate to the lowest point, a placing element resting upon the bottom and having a concave end situated in the receiver, and means operated from the power shaft for reciprocating the placing element moving the concave end from the lowest point in the receiver to a position adjacent to the cracking chamber between the plungers imparting a rolling motion to the nuts during passage over the bottom causing them to assume a longitudinal cracking position.

9. A nut cracking machine having cracking plungers and a power shaft for operating them, a receiver into which elongated nuts are deposited, a floor for the receiver sloping downwardly from the cracking chamber between the plungers and extending through a slotted wall in the receiver, said floor being slotted and grooved; a placing element situated in the groove and having a stud extending through the slotted floor, the end of said element within the receiver being concave, and means having connection with the stud being operated from the power shaft to reciprocate said element over the floor, said concave imparting a rolling motion to the nuts causing them to assume longitudinal positions in the cracking position.

10. A nut cracking machine having cracking plungers, a displaceable receiver situated therebetween defining part of the cracking chamber, means for moving a nut upon the receiver in the cracking position, means for displacing the receiver permitting the fragments to fall out of the cracking chamber, and means forming part of the receiver then moving into the cracking chamber to dislodge any fragments which adhere to the plungers.

11. A nut cracking machine comprising cracking plungers, a pivoted shaft having a portion forming a receiver between the plungers, means for depositing a nut upon the receiver, means to move the receiver upon its pivot to permit dropping of the fragments, and other means forming part of the receiver then moving into the space between the plungers to eject any fragments adhering to the plungers.

12. A nut cracking machine comprising cracking plungers and a power shaft for operating them, a trap pivoted at one side of the plungers having a curved portion constituting a receiver between the plungers, a hook-portion also part of the trap being normally situated out of the way of the plungers, means operated by the power shaft to move a nut into cracking position upon the receiver, and means operated by the power shaft for rocking the trap thereby lowering the receiver to permit dropping of the fragments and advancing the hook portion between the plungers to eject fragments adhering thereto.

13. A nut cracking machine having cracking plungers and a power shaft for operating them, a receiving chamber at one side of the plungers, means operated from the power shaft for depositing nuts into the receiving chamber, a placer bar operable in the chamber adjusting the nut into lengthwise position by its downward motion from under the nut and for pushing the nuts into the cracking chamber between the plungers, the adjusting means of said bar being concave to impart a rolling motion to the nuts causing them to assume said lengthwise position, an eccentric operable by the power shaft, and connections between the eccentric and placer bar for reciprocating the latter in the receiving chamber for the purpose described.

14. A nut cracking machine having cracking plungers and a power shaft for operating them, a receiving chamber at one side of the plungers, means operated from the power shaft for depositing nuts into the receiving chamber, a placer bar operable in the chamber for pushing the nuts into the cracking chamber between the plungers, the pushing means of said bar being concave to impart a rolling motion to the nuts causing them to assume a longitudinal position, an eccentric operable by the power shaft, connections between the eccentric and placer bar for reciprocating the latter in the receiving chamber for the purpose described, a trap having a curved receiver situated beneath the plungers defining part of the cracking chamber, a cam on the power shaft, means operated by the cam to rock the trap to drop shell fragments after a cracking operation, and means forming part of the trap entering the cracking chamber to dislodge shell portions adhering to the plungers.

15. A nut cracking machine having a cracking plunger, means to engage the plunger to produce the cracking action, and means to again engage the plunger to jar loose particles of the cracked nut adhering to the plunger.

16. A nut cracking machine having cracking plungers, means to deliver a nut into position between the plungers, means to primarily move one of the plungers to crack the nut, and means to secondarily move said plunger to jar loose particles of the nut adhering to the plungers.

17. A nut cracking machine having cracking plungers between which a nut is delivered, a power shaft having a cam to engage and move one of the plungers to crack the nut, an ejector movable between the plungers to remove the cracked nut, and a second cam on the power shaft to engage and move said plunger producing a jarring action to displace adhering nut particles.

JOHN L. PICKENS.